United States Patent [19]

Allinikov

[11] 3,744,295
[45] July 10, 1973

[54] PHOTOCHROMIC-THERMOCHROMIC COATING COMPOSITION

[75] Inventor: Sidney Allinikov, Yellow Spring, Ohio

[73] Assignee: The United States of America as represented by the Secretary of the Air Force, Washington, D.C.

[22] Filed: Nov. 24, 1971

[21] Appl. No.: 201,975

[52] U.S. Cl.................. 73/15 R, 73/15.4, 73/150, 252/408
[51] Int. Cl. ...................... G01r 25/18, G01n 19/08
[58] Field of Search...................... 73/15, 15.4, 104, 73/150, 432 R; 252/408

[56] References Cited
UNITED STATES PATENTS

| 3,022,318 | 2/1962 | Berman................................ 252/408 |
| 3,511,086 | 5/1970 | Woodmansee........................... 73/15 |
| 3,161,038 | 12/1964 | Seltzer................................ 73/15.4 |

Primary Examiner—S. Clement Swisher
Attorney—Harry A. Herbert, Jr. and Cedric H. Huhn

[57] ABSTRACT

A photochromic-thermochromic coating composition is provided that comprises a resin base paint, a dye and an enzyme. The coating composition is sensitive to light and heat, thereby rendering it particularly useful in the non-destructive testing of structures to determine the presence of possible flaws.

5 Claims, No Drawings

PHOTOCHROMIC-THERMOCHROMIC COATING COMPOSITION

FIELD OF THE INVENTION

This invention relates to a coating composition which is sensitive to light and heat. In one aspect it relates to a process for the non-destructive testing of various structures.

BACKGROUND OF THE INVENTION

Several non-destructive testing techniques have been used in industry to determine if structural members are free of defects. For example, in the building industry, steel beams are inspected prior to use by ultrasonic and X-ray techniques to detect the possible presence of cracks. Structural panels employed in the construction of aircraft are inspected for flaws both before and after their incorporation into an aircraft.

Several types of panels are employed in the construction of aircraft. One type that is often used has a laminated structure fabricated from two or more layers of material. The layers forming some laminates are bonded together with an adhesive while others are bonded by a heat sealing procedure. Another type of laminated panel has a honeycomb structure in which a layer in the form of a honeycomb is sandwiched between two layers of sheet material. The edges of the honeycomb layer are bonded to the sheets by means of an adhesive or by heat treatment.

Because of the very nature of laminated structures, any deviation from established manufacturing procedures may result in portions of the structures being weakly bonded or even incompletely bonded. Furthermore, after use, originally sound laminated structures may develop weaknesses or flaws. It is important, therefore, to test structural members prior to their use in aircraft construction and periodically after operational use to determine if they are structurally sound. As in the building industry, ultrosonic and X-ray techniques have been utilized in conducting the tests.

For several reasons ultrasonic and X-ray test methods have not proven to be entirely satisfactory. The methods involve the use of expensive and complicated equipment, requiring the services of skilled technicians. In the inspection of parts in place on aircraft, difficulty is often encountered in maneuvering the test equipment into proper position. In my copending U.S. Pat. application Ser. No. 90,813, filed Nov. 18, 1970, there is disclosed a non-destructive test method that overcomes the problems of the conventional test procedures. In accordance with the disclosed method, a paint containing a spiropyran dye is coated on a surface of a laminated structure. When the coating is subjected to ultraviolet light, the dye is activated causing the coating to change color. Now when heat is applied to the coating, the heat will be rapidly conducted away from structurally sound areas, leaving the color of those areas unchanged. However, if there is a flaw in an area, e.g., as a result of poor bonding, heat will not be readily conducted away from that area. The build-up of heat at the surface of the area of the flaw causes the dye to revert to its original color. By proceeding in this method, any flaw in the bonding of a laminated structure can be detected. The invention disclosed and claimed herein is an improvement in that described in my copending patent application.

It is an object of the present invention to provide an improved coating composition for use in the non-destructive testing of structural members.

Another object of the invention is to provide a method for the preparation of a coating composition that is sensitive to ultraviolet light and heat.

A further object of the invention is to provide a method for the non-destructive testing of laminated structures.

Other objects and advantages of the invention will become apparent to those skilled in the art upon consideration of the accompanying disclosure.

SUMMARY OF THE INVENTION

Broadly stated, the present invention resides in a coating composition which comprises a paint, a dye and an enzyme. The dye included in the composition is sensitive to ultraviolet light and heat. It has been discovered that the inclusion of an enzyme in the composition greatly increases the sensitivity of the dye to heat. As a result, when the composition is employed in the non-destructive testing of a structure, as described in more detail hereinafter, the composition functions more effectively and more rapidly in detecting flaws.

In general, urease term "paint" as used herein includes formulations that are generally classified as paint formulations as well as varnish and lacquer formulations. gram principal difference between a paint and a varnish, as these terms are conventionally with is that the latter usually does not include a pigment. In the case of a varnish and a lacquer, the principal difference is that the vehicle or solvent used in a lacquer evaporates more rapidly than that used in a varnish. Thus, the formulations for the paint of the composition of this invention may contain a wide variety of ingredients. In general, the formulations include a film-forming oil or resin and a vehicle or solvent. The formulations may also contain a pigment and a drier. Examples of film-forming oils are tung oil, linseed oil and soybean oil. However, it is generally preferred to employ a resin which may be a natural or synthetic resin. And of the resins it is preferred to employ a synthetic resin. Examples of natural resins include kauri, copal, shellac, pontianak, dammar, sandarac and the like. Synthetic resins that can be used include alkyds, prepared by reacting phthalic, fumaric or maleic anhydride with a polyhydroxy compound, such as glycerol, pentaerythritol, and sorbitol; nitrocellulose; phenolics, such as phenol-formaldehyde and phenol-furfural; amino resins, such as urea-formaldehyde and melamine-formaldehyde; vinyls, such as polyvinyl acetate, polyvinyl alcohol, polyvinyl butyral, polyvinyl pyrrolidone, copolymers of vinyl acetate and vinyl chloride; acrylates, such as polymethacrylate, polymers of methyl methacrylate and polymers of butyl acrylate; polymers and copolymers of ethylene, propylene, styrene, butadiene and isoprene; and the like.

Various classes of materials can be used as the vehicle or solvent. Examples of suitable vehicles or solvents include water; turpentine; aromatic hydrocarbons, such as benzene, toluene, and the xylenes; chlorinated hydrocarbons, such as trichloroethylene; alcohols, such as ethanol and butanol; ketones, such as acetone, isobutyl ketone, methyl ethyl ketone; esters, such as ethyl acetate; and the like. Furthermore, mixtures of the aforementioned compounds can be employed as the vehicle.

In addition to the components mentioned above, the paint may contain a pigment although its presence is not necessary. When a pigment is used, its color must be substantially different from that of the dye contained in the coating composition of this invention. If the dye and the pigment are of the same or similar color, they will mask one another so that the coating composition will be unsuitable for use in the nondestructive test method of this invention. If a pigment is utilized, it is usually preferred that it be a white pigment, such as titanium dioxide, zinc oxide, and calcium carbonate. However, yellow pigments, such as those of hydrated ferric oxide, lead monoxide, and lead or zinc chromate, brown pigments, such as manganese dioxide, green pigments, such as chromic oxide, as well as pigments of other colors can be used as long as they do not interfere with or cover up the color of the dye. Furthermore, it is usually preferred that the amount of the pigment be less than that which is ordinarily utilized in conventional paint formulations. A lesser amount is used in order to avoid the possibility of the pigment's color dominating the color of the dye when the coating composition is subjected to ultraviolet light. In cases where the coating composition in the absence of a pigment is colored, it is often desirable to use a pigment, particularly a white pigment.

The dyes that are included in the coating composition of this invention are those that are sensitive to ultraviolet light and heat. A class of dyes that can be advantageously used is commonly referred to as substituted spiropyrans. These compounds can also be identified as 1,3,3-trimethylindolinobenzopyrylospiran and they can be represented by the following structural formula:

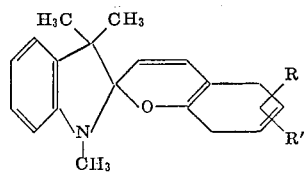

where R and R' are selected from the group consisting of H, NO$_2$, Cl, Br, alkyl, alkenyl and alkoxy. The alkyl, alkenyl and alkoxy groups preferably contain from one to six, inclusive, carbon atoms. The dyes are prepared by reacting salicylaldehyde or a derivative thereof with 1,3,3-trimethyl-2-methyleneindoline. Examples of suitable substituted spiropyran dyes with their color indicated in parentheses include 6'-nitro-1,3,3-trimethylindolinobenzopyrylospiran (purple); 7'-nitro-1,3,3-trimethylindolinobenzopyrylospiran (orange); 7'-chloro-1,3,3-trimethylindolinobenzopyrylospiran (purple); 6',8'-dibromo-1,3,3-trimethylindolinobenzopyrylospiran (blue); 6'-nitro-8'-allyl-1,3,3-trimethylindolinobenzopyrylospiran (purple); 6'-nitro-8'-bromo-1,3,3-trimethylindolinobenzopyrylospiran (purple); 6'-chloro-8'-nitro-1,3,3-trimethylindolinobenzopyrylospiran (purple); 6'-bromo-8'-nitro-1,3,3-trimethylindolinobenzopyrylospiran (purple); 6'-nitro-8'-methoxy-1,3,3-trimethylindolinobenzopyrylospiran (dark blue); 6'-methoxy-8'-nitro-1,3,3-trimethylindolinobenzopyrylospiran (green); 5'-nitro-8'-methoxy-1,3,3-trimethylindolinobenzopyrylospiran (dark green); and the like.

Any of the well known enzymes can be used in preparing the coating composition of this invention. Examples of enzymes that have been found to be especially suitable includes bromelain, cellulase, ficin, glucose oxidase, papain, and urease. Other exemplary enzymes are amylase, catalase, maltase, pepsin, rennin and trypsin. It is generally recognized that enzymes are extremely specific as to the reactions that they will catalyze. Accordingly, it was unexpected when it was found that enzymes in general function to increase the sensitivity of the dye to heat.

The amounts of the components in the paint formulation can vary within rather wide limits. However, the amounts usually range from about five to 20 parts by weight of the film-forming oil or resin, 75 to 95 parts by weight of the solvent or vehicle and zero to five, preferably zero to three, parts by weight of the pigment. Only relatively small amounts of the dye and the enzyme are required for use in the coating composition. Generally, the amount of dye is in the range of about 0.25 to 1.0 part by weight and the amount of enzyme is in the range of about 0.05 to 0.15 part by weight, both based on 100 parts by weight of the paint formulation.

In one method of preparing the coating composition of this invention, the dye and enzyme are merely added to the paint and stirred until a homogeneous mixture is obtained. The following is an example of a preferred paint formulation:

| Component | Parts by weight |
|---|---|
| Polyvinyl acetate | 5–20 |
| Toluene | 0–25 |
| Methyl ethyl ketone | 0–70 |
| Isobutyl ketone | 0–20 |
| Titanium dioxide | 0–5 |
| Total: | 100 |

The amounts of dye and enzyme added to the paint fall in the ranges mentioned in the preceding paragraph. Mixing of the ingredients is conducted at between room temperature and about 50° C.

The preferred method of preparing the coating composition of this invention involves the coprecipitation of an enzyme with dye crystals. The dye crystals containing an enzyme is then mixed with the paint in the manner described in the preceding paragraph.

In preparing the dye crystals containing an enzyme, ferrous chloride in the amount of, e.g., about 0.1 gram, is added to 15 milliliters of formamide in which it is dissolved by gently heating to about 50° C. A small amount, e.g., about 0.05 gram, of an enzyme is then dissolved in the resulting solution by stirring the solution at about 50° C. It is to be understood that the amount of enzyme that can be added can vary, depending, in general, upon the amount of enzyme that the dye crystals are to contain. The ratio of enzyme to total dye reactants, i.e., aldehyde and indoline, can vary within rather wide limits, e.g., on a weight basis, from about 0.15 to 1.5 to 1. There is then added a small amount, e.g., about 0.3 gram, of a salicylaldehyde derivative, such as 5-nitrosalicylaldehyde, while continuing to stir at about 50° C until the aldehyde dissolves. Ethyl alcohol is then added in an amount about sufficient to double the volume of the solution. Thereafter, a small amount, e.g., about 0.3 gram of 1,3,3-trimethyl-2-methyleneindoline, is added and the stirring is continued at an increased temperature of about 91° C for a period of about 15 minutes. The ratio of aldehyde to indoline on a weight basis is generally 1:1 although it can vary to a slight degree, e.g., from 0.95:1 to 1:0.95. Upon allowing the solution to cool to room temperature, crystals of spiropyran dye containing the enzyme precipitate from solution. The dye crystals containing an enzyme can be recovered by any suitable means such as by filtration. When 5-nitrosalicylaldehyde is used as described above, crystals of 6'-nitro-1,3,3-trimethylindolinobenzopyrylospiran containing an enzyme are formed. However, it is to be understood that other salicylaldehyde derivatives may be similarly used in preparing crystals of other members of the class of spiropyran dyes described above that contain an enzyme.

The coating composition of this invention is particularly useful in the non-destructive testing of honeycomb laminated structures, such as those used to fabricate aircraft radomes, and laminated structures composed of two or more bonded sheets of material. In conducting the test, the coating composition is applied, e.g., by brushing or spraying, to a surface of the laminate and permitted to dry at ambient temperature. It is only necessary to apply a thin coating although the thickness can vary within rather wide limits, e.g., from 2 to 15 mils. After drying the coating is colorless or colored depending upon whether a pigment is used. If colored, the coating is usually white since it is preferred to use a white pigment. The dry coating is then subjected to ultraviolet radiation or light for a short period of time, e.g., for about 1 to 10 seconds. As a result of the exposure of the coating to ultraviolet light, it assumes a color corresponding to the color of the dye contained in the coating composition. The colored coating is next gently heated, preferably by means of warm air supplied by a heat gun. If poorly bonded or non-bonded areas are present between layers, heat is not conducted away from the surfaces above such areas as rapidly as it is away from surfaces above areas where good bonds exist. As a result heat builds up in the surface areas overlying flaws in the bonding. This build-up of heat causes the color in those areas to fade or revert to the original color of the coating, e.g., to a white or colorless state, thereby indicating the presence and location of the flaws. Moreover, should imperfections in the nature of foreign material, e.g., water droplets or an excessive amount of adhesive, be present between the layers of the structure, the surface areas overlying the imperfections retain their color for a longer period of time than the surrounding areas. Thus, the composition of this invention can be employed to detect the presence of foreign material in laminated structures as well as flaws in bonding.

As mentioned above, in the practice of the test method, the dried coating is gently heated. In general, the temperature should not exceed about 50° C, with a temperature ranging from about 30° to 50° C being preferred and more desirably a temperature ranging from about 30° to 40° C. Temperatures above about 50° C have been found to cause the color to fade too rapidly whereas temperatures below 30° C result in a very slow fading of the color. Furthermore, excessively high temperatures that would result from use of a flame in contact with or in close proximity to the coating may result in failure of a selective change in color to occur. Only a short heating period is required, from 5 to 20 seconds generally being sufficient to cause the change in color.

A more complete understanding of the invention may be obtained by referring to the following illustrative examples which are not intended, however, to be unduly limitative of the invention.

EXAMPLE I

Crystals of 6'-nitro-1,3,3-trimethylindolinobenzopyrylo-spiran containing papain were prepared by the coprecipitation method described above. The papain-containing dye crystals in the amount of 0.4 gram (0.35 part per 100 parts of paint) were mixed with the following paint formulation. The enzyme papain constituted about 25 weight percent of the cystals.

| | Amount, gms | Parts by weight |
|---|---|---|
| Polyvinyl acetate | 12.5 | 10.9 |
| Toluene | 20.0 | 17.4 |
| Methyl ethyl ketone | 60.0 | 52.2 |
| Methyl isobutyl ketone | 20.0 | 17.4 |
| Titanium dioxide | 2.5 | 2.2 |
| Totals: | 115.0 | 100.1 |

The dye crystals containing papain and the paint were heated to about 50° C and stirred until thoroughly mixed.

EXAMPLE II

Sandwich type structures were fabricated by adhesively bonding a flat sheet of plastic to one side of a flat sheet of aluminum. To the other side of the aluminum sheet, a perforated sheet of aluminum was adhesively bonded. There were 8 perforations in each of the perforated sheets, the diameters of the perforations being one sixty-fourth, one thirty-second, one-sixteenth, one-eighth, three-sixteenths, one-fourth, three-eighths, and one-half inch.

In a first series of tests, the coating composition prepared in Example I was applied to the surface area of the plastic layer of about one-half of the sandwich type structures and permitted to dry.

In a second series of tests a coating composition consisting of a mixture the same paint prepared in Example I and 6'-nitro-1,3,3-trimethylindolinobenzopyrylospiran was applied to the surface of the plastic layer of the remaining half of the sandwich type structures and permitted to dry.

In each series of tests, the dried white coatings were subjected to ultraviolet radiation (3660A) for about 3 seconds. The dye in the coating compositions was thereby activated, causing the white coatings to turn to a purple color. The colored coatings of each laminated structure were then heated to about 40° C with a hot air gun.

In the first series of tests in which an enzyme was present in the coating composition, the surface areas above the six largest perforations reverted to their original white color in the case of each laminate. With some laminates surface areas above seven or all eight of the perforations changed to the original white color.

In the second series of tests in which the coating composition did not contain the enzyme, only the surface areas above the four largest perforations reverted to their original white color.

The data obtained from the tests demonstrate that the presence of an enzyme in the coating containing a dye increased the sensitivity of the dye to heat. Thus, the non-destructive test method of this invention employing a paint containing a dye and an enzyme is more effective in detecting flaws in laminated structures.

EXAMPLE III

A series of tests was conducted with a honeycomb structure fabricated from a plastic honeycomb adhesively bonded between two flat sheets of plastic material. Drops of water and excess adhesive were deliberately entrapped within the honeycomb structure.

The coating composition of Example I containing dye and enzyme was applied to the flat exposed surfaces of the plastic sheet material of each structure and allowed to dry. After drying the coatings were subjected to a source of ultraviolet light for about 4 seconds. The surfaces were then heated to about 40°C with a hot air gun.

In the case of each honeycomb structure, the area of the surface coating directly above a foreign material retained its color for a longer period of time than did surrounding surface areas.

The foregoing tests demonstrate that the method of this invention can be utilized to determine the presence and location of foreign materials in a laminated structure.

EXAMPLE IV

In a series of runs, crystals of 6'-nitro-1,3,3-trimethyl-indolinobenzopyrylospiran containing an enzyme, namely, amylase, glucose oxidase, unrease or cellulase, were prepared by the coprecipitation method described hereinabove. Each of the enzyme-containing dye crystals in the amount of 0.4 grat (0.35 part per 100 parts of paint) was mixed With the same formulation described in Example I.

The several coating compositions so prepared were applied to laminates of the type described in Example II, and the same test procedure was followed. Substantially the same results were obtained as in Example II in that the presence of the enzymes in the coatings containing a dye increased the sensitivity of the dye to heat.

The several coating compositions were also applied to laminates having a honeycomb structure which had been treated so as to have imperfections as described in Example III. The coated structures were subjected to the same test procedures as in Example III, and in each test the area of the surface directly above a foreign material retained its color for a longer period of time than did surrounding surface areas.

EXAMPLE V

The runs described in the foregoing examples were repeated except that the paint formulation was changed by substituting different synthetic resins for polyvinyl acetate in the formulation described in EXAMPLE I. Thus, paint formulations were utilized which contained as the resin a copolymer of vinyl chloride and vinyl acetate, polyvinyl chloride, polymethacrylate and a polymer of butyl acrylate. In the tests that were conducted by coating laminates having sandwich-type and honeycomb-type structures, the results obtained were substantially the same as those described in the preceding examples.

EXAMPLE VI

The enzyme urease-containing crystals of 6'-nitro-1,3,3-trimethylindolinobenzopyrylospiran were prepared by the coprecipitation method described above. The urease-containing dye crystals in the amount of 0.1 gram (0.5 part per 100 parts of paint) was mixed with the following paint formulation:

|  | Amount, gms | Parts by weight |
|---|---|---|
| Polyvinyl alcohol | 5 | 25 |
| Methanol | 10 | 50 |
| Water | 5 | 25 |
| Totals: | 20 | 100 |

The urease-containing dye crystals and the paint were heated to about 50° C and stirred until thoroughly mixed.

The coating composition so prepared was applied to laminated structures as described in Examples II and III. Control specimens were also prepared which were coated with a composition that contained the dye but not the enzyme.

The coated sandwich-type and honeycomb-type laminates were subjected to the tests described in Examples II and III. The results of the tests demonstrated that the inclusion of the enzyme increased the effectiveness of the dye in detecting flaws and the presence of foreign materials in the laminated structures.

As will be evident to those skilled in the art, various modifications of this invention can be made or followed in the light of the foregoing disclosure without departing from the spirit or scope of the invention.

I claim:

1. A method for the non-destructive testing of structures which comprises the following steps:
   a. applying to a surface of a structure a coating composition consisting essentially of a paint, a substituted spiropyran dye and an enzyme;
   b. allowing the coated surface to dry at a temperature below about 30° C;
   c. subjecting the dried coated surface to ultraviolet radiation; and
   d. heating the surface exposed to ultraviolet radiation at a temperature in the range of about 30° to 50° C.

2. The method according to claim 1 in which the paint is a resin base paint; and the enzyme is a member selected from the group consisting of papain, amylase, glucose oxidase, urease and cellulase, the amount of the dye being in the range of about 0.25 to 1.0 part by weight and the amount of the enzyme being in the range of about 0.05 to 0.15 part by weight, both amounts being based on 100 parts by weight of the paint, said dye having the following structural formula:

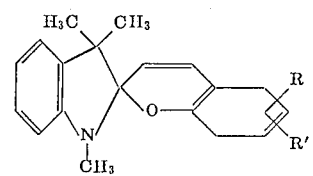

wherein R and R' are selected from the group consisting of H, NO$_2$, Cl, Br, alkyl, alkenyl and alkoxy.

3. The method according to claim 1 in which the structure is a laminate.

4. The method according to claim 2 in which the paint comprises about five to 20 parts by weight of a resin, about 75 to 95 parts by weight of a solvent, and about zero to five parts by weight of a pigment, based on a total of 100 parts by weight.

5. The method according to claim 4 in which the resin is a member selected from the group consisting of polyvinyl acetate, a copolymer of vinyl chloride and vinyl acetate, polyvinyl chloride, polymethacrylate and a polymer of butyl acrylate; the solvent is a member selected from the group consisting of water, aromatic hydrocarbons, chlorinated hydrocarbons, alcohols, ketones, and esters, and the pigment is a member selected from the group consisting of a titanium dioxide, zinc oxide and calcium carbonate.

* * * * *